(12) United States Patent
Shoaf (10) Patent No.: US 8,998,524 B2
(45) Date of Patent: Apr. 7, 2015

(54) LIQUID APPLICATION DEVICE

(76) Inventor: Robert A. Shoaf, London, OH (US)

(*) Notice: Subject to any disclaimer, the term of this patent is extended or adjusted under 35 U.S.C. 154(b) by 574 days.

(21) Appl. No.: 13/295,371

(22) Filed: Nov. 14, 2011

(65) Prior Publication Data

US 2012/0121314 A1 May 17, 2012

Related U.S. Application Data

(60) Provisional application No. 61/412,838, filed on Nov. 12, 2010.

(51) Int. Cl.
*B43K 5/00* (2006.01)
*A01M 21/04* (2006.01)

(52) U.S. Cl.
CPC .................................. *A01M 21/043* (2013.01)

(58) Field of Classification Search
CPC .................................................. A01M 21/043
USPC .................. 401/198, 206, 264, 117; 47/1.5
See application file for complete search history.

(56) References Cited

U.S. PATENT DOCUMENTS

| | | | | |
|---|---|---|---|---|
| 2,841,923 A * | 7/1958 | Dickison | .................... | 47/1.01 R |
| 2,979,757 A * | 4/1961 | Smith | ........................... | 401/206 |
| 4,027,986 A * | 6/1977 | Patrick | .............................. | 47/1.5 |
| 4,403,881 A * | 9/1983 | Keeton | ........................... | 401/202 |
| D274,597 S * | 7/1984 | Baumber | ........................... | D8/2 |
| 4,882,874 A * | 11/1989 | Paulson et al. | ................... | 47/1.5 |
| 5,329,727 A * | 7/1994 | Dixon | ............................. | 47/1.5 |
| 5,555,673 A * | 9/1996 | Smith | ............................. | 47/1.5 |
| 5,568,990 A * | 10/1996 | McAuley | ...................... | 401/206 |
| 5,960,802 A * | 10/1999 | Sakai | ........................... | 401/206 |
| 7,182,541 B1 * | 2/2007 | Ziniti et al. | ................... | 401/206 |
| 8,128,302 B2 * | 3/2012 | Zhao et al. | .................... | 401/117 |
| 8,438,778 B2 * | 5/2013 | Rose | ............................. | 401/206 |
| 2003/0133739 A1 * | 7/2003 | Zhadanov et al. | ........... | 401/206 |
| 2008/0060261 A1 * | 3/2008 | Stevenson | ....................... | 47/1.5 |
| 2010/0044469 A1 * | 2/2010 | Ballu | ........................... | 239/375 |
| 2013/0149021 A1 * | 6/2013 | Kast | ............................. | 401/146 |

* cited by examiner

*Primary Examiner* — David Walczak
*Assistant Examiner* — Bradley Oliver
(74) *Attorney, Agent, or Firm* — Jason H. Foster; Kremblas & Foster (57) ABSTRACT

A liquid-application device that permits a user to selectively apply herbicide to weeds without applying the herbicide to adjacent plants. A reservoir of herbicide is mounted to a container end of an elongated tube and a wick is mounted to an opposite end. The tube has a central passage through which the liquid flows from the container end to the wick end by gravity. A valve mechanism at the wick end controls the flow of liquid out of the central passage. A wick retainer in the valve mechanism holds a wick that receives liquid released through the valve. A shroud covers the wick and the wick protrudes after the shroud is seated on a weed leaf. The shroud can be withdrawn by a mechanical connection, such as a trigger, or by simply forcing the shroud out of the way.

2 Claims, 6 Drawing Sheets

LIQUID APPLICATION DEVICE

CROSS-REFERENCES TO RELATED APPLICATIONS

This application claims the benefit of U.S. Provisional Application No. 61/412,838 filed Nov. 12, 2010. This prior application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The invention relates to non-spraying liquid application devices, and more particularly to devices for applying liquid, such as herbicide, to plants in order to control the growth of the plants.

It is well known to spray liquids onto substrates, such as plant leaves, in order for the liquid to be absorbed into the substrates. In the case of applying plant food or herbicides to plant leaves, it is common to spray the liquid in order to ensure coverage on the plant. However, there is a significant disadvantage to this process, inasmuch as any sprayed liquid that does not adhere to the plant falls downwardly or to the side and can contact adjacent plants. This can cause the result meant for the intended plant to occur in an unintended, adjacent plant. In the context of herbicides sprayed on weeds, any over-sprayed herbicide can kill adjacent, desirable plants.

There is a need for an applicator of liquids, such as herbicides, onto plants that avoids the problem of overspray.

BRIEF SUMMARY OF THE INVENTION

A liquid-application device is described herein, and preferably a liquid-herbicide-application device is described that permits a user to selectively apply herbicide to weeds and other plants without applying the herbicide to adjacent plants. The device permits a user to apply the liquid with pinpoint accuracy without bending over. One simply walks along and applies the liquid only to the plant(s) desired.

The device is an elongated apparatus that can be gripped by a human user and carried as the user walks through a garden or other area. The device has a container of herbicide or other liquid mounted to a container end, and an opposite end with a wick that is applied to the weed or other plant. A tube has a central passage through which the liquid flows from the container end to the wick end under the influence of gravity or other force. A valve mechanism is inserted in the wick end of the tube to control the flow of liquid out of the central passage. A wick retainer is formed in the valve mechanism and holds a wick that receives liquid released through the valve.

A shroud covers the wick and valve mechanism and the wick protrudes therefrom once the shroud is placed on the plant leaf that is to have herbicide applied to it. The shroud can be withdrawn by a mechanical connection, such as a trigger and linkage, or by simply forcing the shroud out of the way.

When it is desired to apply liquid, such as herbicide, to a surface, the shroud is placed against the surface and then is withdrawn to expose the wick. The wick is then forced into the surface, thereby causing liquid to be applied to the surface. The force applied against the surface also opens the valve mechanism to permit a small amount of the liquid to flow into the wick.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Patent application Ser. No. 61/412,838 filed Nov. 12, 2010, is incorporated in this application by reference.

Figure 1:
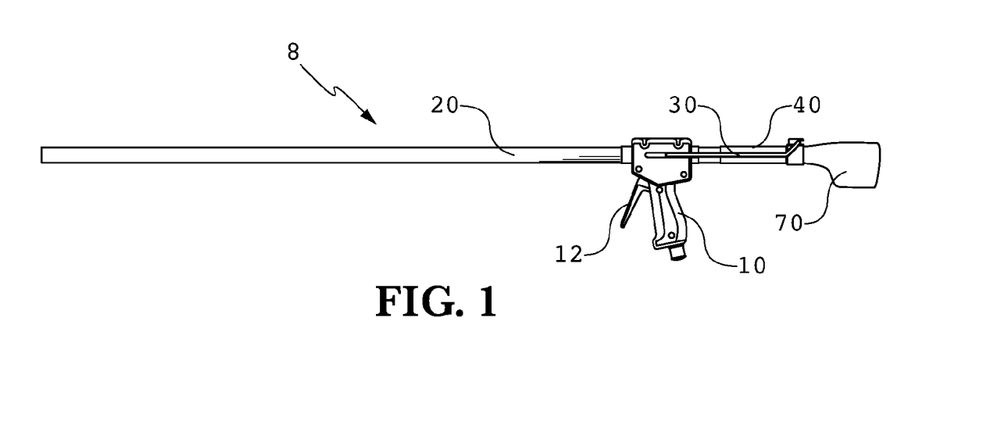
FIG. 1 is a side view illustrating a first embodiment of the present invention.
Figure 2:
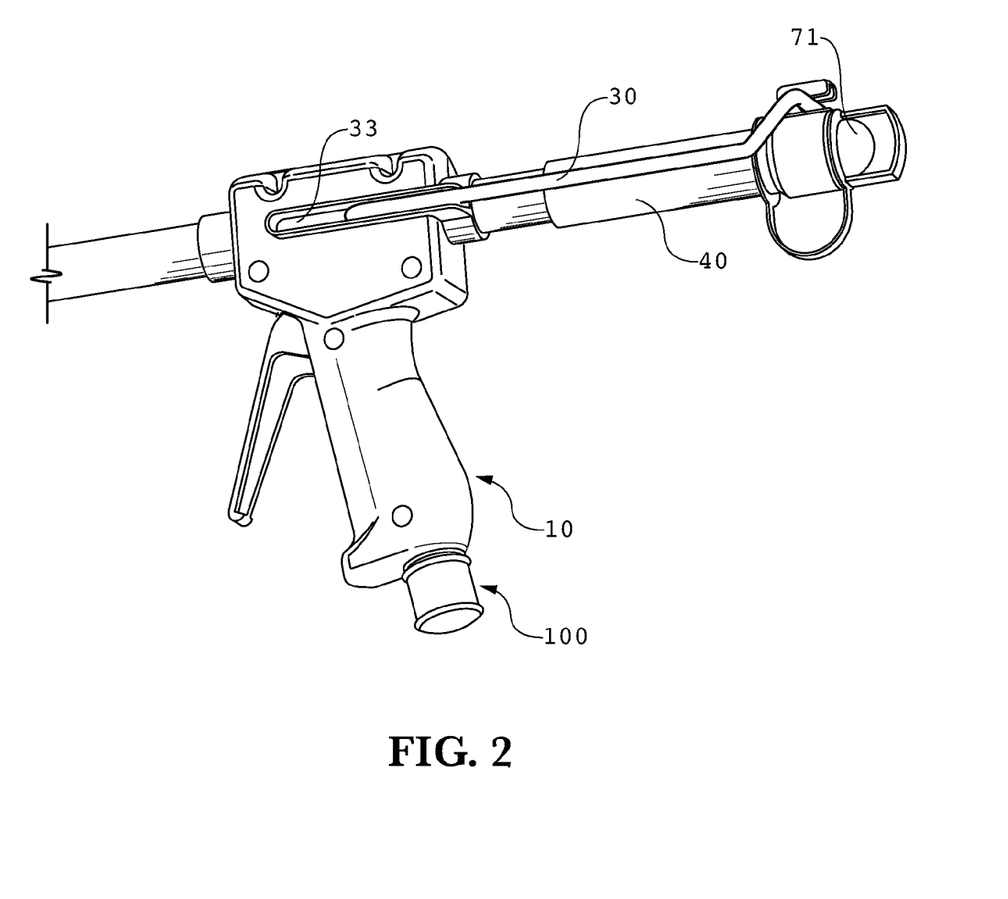
FIG. 2 is a view in perspective illustrating the embodiment of FIG. 1.
Figure 3:
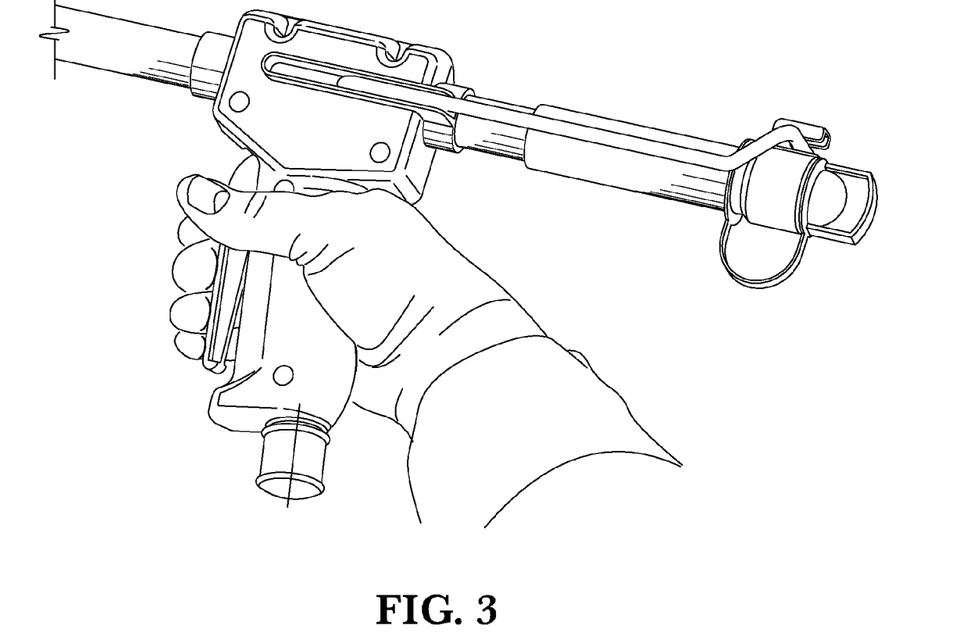
FIG. 3 is a view in perspective illustrating the embodiment of FIG. 2.

As shown in FIG. 1, the device 8 has a hand-grippable handle 10 rigidly mounted to an elongated, outer tube 20. The outer tube 20 can be a piece of polyvinyl chloride (PVC) tubing or any other suitable material. The handle 10 is a rigid, preferably molded plastic body that surrounds, and mounts to, the outer tube 20, as shown in FIGS. 2 and 3. The handle 10 is mounted rigidly to the outer tube 20 so that during normal use, forces applied to the handle are conveyed to the outer tube. No force applied during normal use is able to move the handle relative to the outer tube 20 because of the rigid connection therebetween.

A finger-actuatable trigger 12 extends from the handle 10. The trigger 12 is mounted to the handle 10 to pivot relative to the handle 10 and the outer tube 20. The trigger 12 can be moved by a hand (shown in FIG. 3) that grasps the handle 10 with the palm of the hand seating against the handle 10. One or more fingers extended around the trigger 12 squeeze the trigger 12 toward the handle 10 to the position shown in FIG. 3.

The end of the trigger 12 opposite the portion that the user's fingers contact is within the handle 10 and is drivingly linked to one end of the beam 30. With this driving linkage, any squeezing of the trigger toward the handle 10 causes the opposite end of the trigger to apply a longitudinal force to the beam 30, and thereby drive the beam 30 longitudinally along the outer tube 20 toward the handle 10. The entirety of the beam 30 is thus longitudinally displaced because the beam is preferably made of a very strong material, such as steel.

The distal end of the beam 30 is mounted to the central tube 42, or, more preferably, to a connecting member 40 that is mounted to the central tube 42 that is coaxial with, and moveable longitudinally relative to, the outer tube 20. The central tube 42 is a PVC, or any other suitable material, tube that has a smaller outer diameter than the inner diameter of the outer tube 20, thereby allowing the central tube 42 to slide longitudinally within the outer tube 20. A longitudinal force applied to the connecting beam 30 is transferred to the connecting member 40, which transfers the force to a proximal end of a central tube 42. Thus, upon squeezing the trigger, the beam 30 and connecting member 40 are displaced toward the handle 10. This likewise displaces the central tube 42 longitudinally within the outer tube 20.

A container 70, which is preferably a commonly available plastic bottle of herbicide but could be a container of any suitable size, shape and material, has a male threaded spout that is screwed into a complementary female threaded opening in the end of the connecting member 40. The connecting member 40 has a central passage that is in fluid communication with a cylindrical passage through the central tube 42. Thus, any fluid in the container 70 can, by gravity or other means, pass from the container's 70 interior chamber through the central tube 42 to the opposite, distal end of the central tube 42. This is for reasons that will become apparent from the description below of the valve mechanism mounted on the distal end of the central tube (opposite the container 70). Of course, any reservoir mounted to or within the central tube 42 can be substituted for the container 70.

Figure 4:
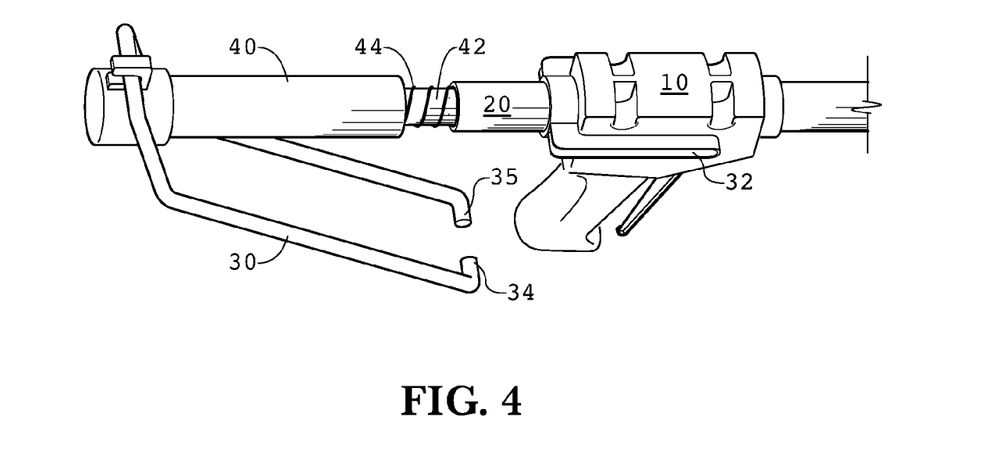
FIG. 4 is a top exploded view illustrating the embodiment of FIG. 2.

As shown in FIG. 4, which shows the device 8 in an inoperable, partially-disassembled configuration, the connecting member 40 is fixed to the central tube 42, and a coil spring 44 extends around the central tube 42. The coil spring 44 seats at one longitudinal end against the connecting member 40, and at the opposite end against a ring (not shown) extending radially inwardly from the outer tube 20 to be compressed when the trigger 12 is squeezed. Thus, when the device 8 is in an operable and assembled configuration, displacement of the trigger 12 toward the handle 10 thereby displaces the central tube 42 longitudinally, thereby compressing the spring 44. Upon release of the squeezed trigger 12, the spring 44 returns the central tube 42 and trigger 12 to their original positions relative to the outer tube 20 so that they can be squeezed again for accomplishing the same result.

In FIG. 4, the beam 30 is shown removed from the handle 10, having been spread apart by manual force and withdrawn from the slots 32 and 33 in which it slides. The inwardly facing legs 34 and 35 of the beam 30 fit, when mounted in the operable position shown in FIGS. 2-3, through the slots 32 and 33 and into the top of the handle 10 where the upper end of the trigger 12 is positioned. The central tube 42 is also shown withdrawn somewhat from the outer tube 20 in FIG. 4, and further withdrawal would result in further removal of the central tube 42 from the outer tube 20. Replacement of the central tube 42 occurs in the reverse direction and the beam 30 is replaced in reverse manner as well.

Figure 5:
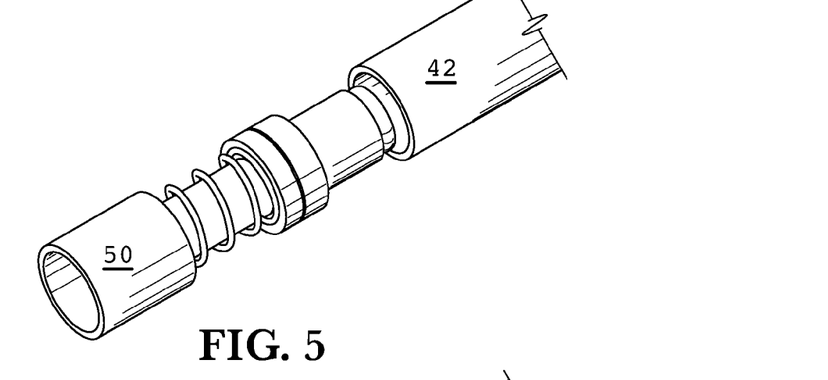
FIG. 5 is a side view illustrating the valve mechanism of the embodiment of FIG. 2 in a state of partial disassembly.
Figure 6:
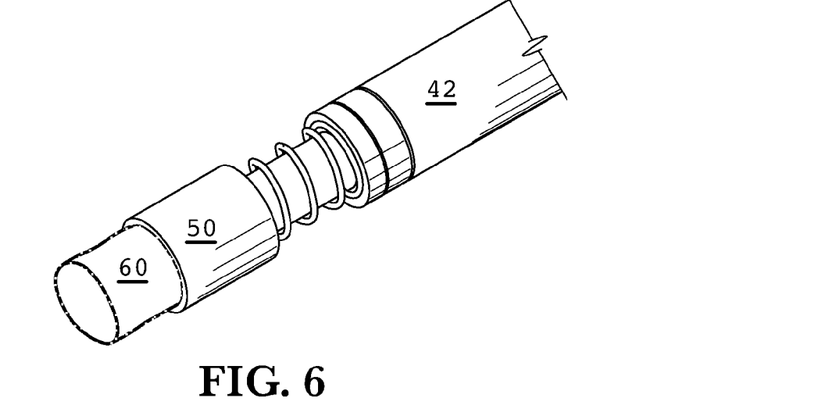
FIG. 6 is a side view illustrating the valve mechanism of the embodiment of FIG. 2 in a state of partial disassembly.

A valve mechanism 50 is shown in FIG. 5 adjacent the end of the central tube 42 opposite the container 70. As shown in FIG. 6, one end of the valve mechanism 50 is inserted into the passage extending through the central tube 42 and is retained therein by friction, adhesive or a fastener, such as a screw. A wick 60 is inserted into the opposite end of the valve mechanism 50, and is preferably retained therein by friction. The wick is preferably cloth, woven batt or non-woven batt of absorbent material, such as cotton or felt, and permits water and liquids with characteristics similar to water to flow by capillary action through the wick from one end to the other. Because the valve mechanism 50 has a passage that allows liquid to flow from one end of the valve mechanism 50 to the other under particular circumstances, such as when it is open, any liquid in the passage of the central tube 42 (which preferably enters the passage from the container 70) passes through the valve mechanism 50 to the wick 60 as described below. This permits application of the liquid to a plant or other surface.

Figure 7:
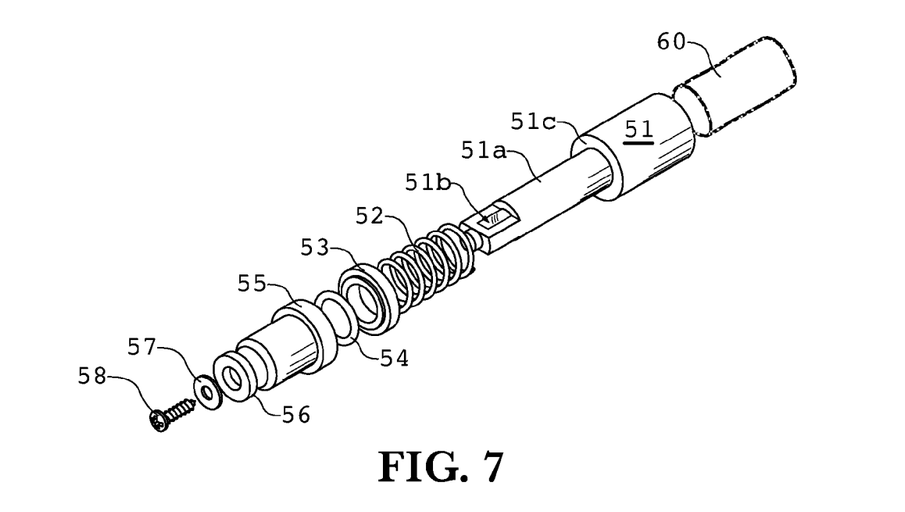
FIG. 7 is an exploded view in perspective illustrating the valve mechanism of FIG. 6.
Figure 8:
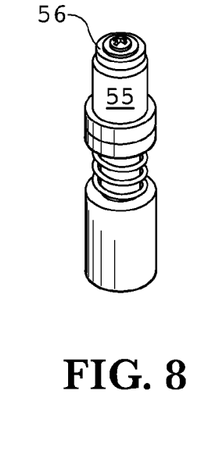
FIG. 8 is a view in perspective illustrating the valve mechanism of FIG. 6.
Figure 9:
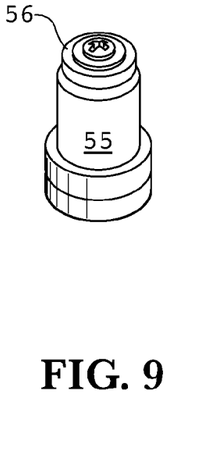
FIG. 9 is a view in perspective illustrating the valve mechanism of FIG. 6.

The valve mechanism 50 is shown in detail in FIG. 7. The wick retainer 51 and all other components of the valve mechanism (other than the screw, washer and spring, which are metal) are preferably made of plastic or other suitable material. The wick retainer 51 has a cylindrical cavity in one end in which the wick 60 is mounted. The cylindrical cavity is in fluid communication with a fluid flow passage extending through the entire length of the wick retainer 51. An elongated finger 51a is formed on the opposite end of the wick retainer 51. The fluid flow passage extends through the elongated finger 51a and terminates at an aperture 51b formed at the exterior of the finger 51a. Thus, any liquid at the aperture 51b can flow through the passage in the finger 51a to the wick 60.

The coil spring 52 extends around the finger 51a and seats at one end against the shoulder 51c of the wick retainer. The opposite end of the spring 52 seats against the seal retainer 53. The o-ring 54 is clamped between the seal retainer 53 and the valve body plug 55, and extends radially inwardly to seal against the radially outwardly facing surface of the finger 51a to prevent liquid from passing the o-ring 54. The finger 51a extends through the spring 52, seal retainer 53 and valve body plug 55 to the screw 58, flat washer 57 and seal washer 56. The screw 58 is threaded into an aperture at the end of the finger 51a, thereby fixing the seal washer and flat washer to the finger.

Figure 10:
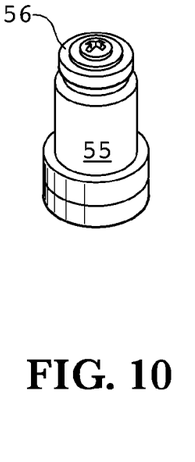
FIG. 10 is a view in perspective illustrating the valve mechanism of FIG. 6 in a state of being partially opened.
Figure 11:
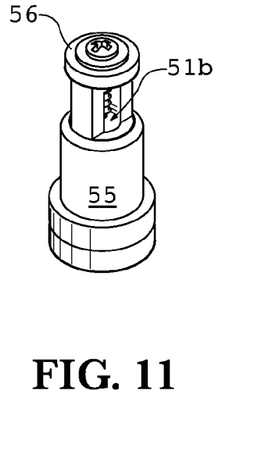
FIG. 11 is a view in perspective illustrating the valve mechanism of FIG. 6 in a state of being fully opened.

As shown in FIGS. 8-11, the valve mechanism 50 opens and closes by longitudinal displacement of one group of components relative to another group of components. The valve mechanism is closed in FIGS. 8 and 9 where the seal washer 56 seats against the end of the valve body plug 55. In FIGS. 10-11 the wick retainer 51 and integral finger 51a are shown displaced relative to the valve body plug 55 to varying degrees. This displacement from the closed position, which displacement simultaneously compresses the spring 52 and moves the seal washer 56 away from the valve body plug 55, temporarily breaks the liquid seal formed at the juncture of the seal washer 56 and the hollow valve body plug 55 and liquid inside the central tube 42 can flow into the aperture 51b.

Once in the aperture 51b, the liquid flows through the passage in the finger 51a and contacts the end of the wick 60. By capillary action the liquid reaches the tip of the wick 60. Thus, opening of the valve mechanism 50 permits some amount of liquid in the central tube 42 to contact the wick 60. Upon release of the force that holds open the valve mechanism 50, the spring 52 forces the components back to a sealed configuration wherein no liquid can pass through the aperture 51b.

Therefore, when the trigger 12 is squeezed, the central tube 42 is moved longitudinally away from the handle 10 relative to the outer tube 20. Prior to squeezing of the trigger 12, the central tube 42 is preferably withdrawn in the outer tube 20 by a short distance, and the outer tube 20 thereby covers, and substantially surrounds, the valve mechanism 50. The longitudinal displacement of the central tube 42 displaces the valve mechanism 50 out of the outer tube 20 a short distance. This displacement of the valve mechanism 50 relative to the outer tube 20 allows liquid in the central tube 42 to flow into the wick 60 when the wick 60 and wick holder 51 are manually displaced relative to the central tube 42. This manual displacement of the wick 60 and wick holder 51 occurs by pushing the entire device 8 toward the wick 60 when the wick 60 is seated against an object, such as the ground or a weed.

The device 8 works as follows. A user of the device 8 holds it by the handle 10 in the right or left hand in the manner of a firearm as shown in FIG. 3. An open bottle of herbicide, such as the container 70, is mounted in the connecting member 40 by inserting the threaded male end of the container 70 into the threaded female end of the connecting member 40. This is preferably accomplished when the container 70 is facing upright and the device 8 is above the container 70. The device 8 is next turned with the container 70 at the top and the wick 60 at the bottom. This permits the liquid in the container 70 to flow downwardly toward the valve mechanism 50, which is mounted in the central tube 42, under the influence of gravity. Liquid cannot pass from the passage in the central tube 42 to the wick 60 without passing through the valve mechanism 50. During initial "arming" of the device 8, which is the initial wetting of the wick 60 by the liquid herbicide or other liquid in the container 70, the valve mechanism 50 is opened manually for an extended period to allow the herbicide to soak the wick 60. This is preferably accomplished as described next.

Figure 12:
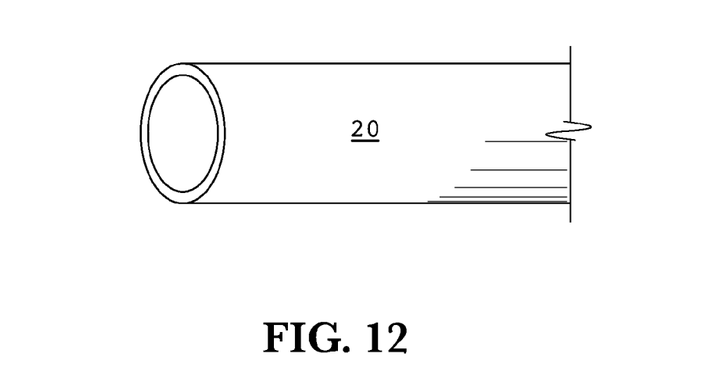
FIG. 12 is a view in perspective illustrating the wick end of the embodiment of FIG. 1 with the wick completely covered by the outer tube.
Figure 13:
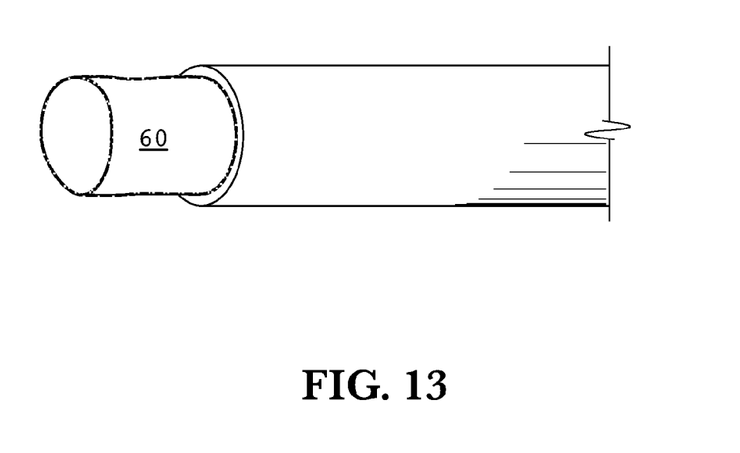
FIG. 13 is a view in perspective illustrating the wick end of the embodiment of FIG. 1 with the wick partially covered by the outer tube.
Figure 14:
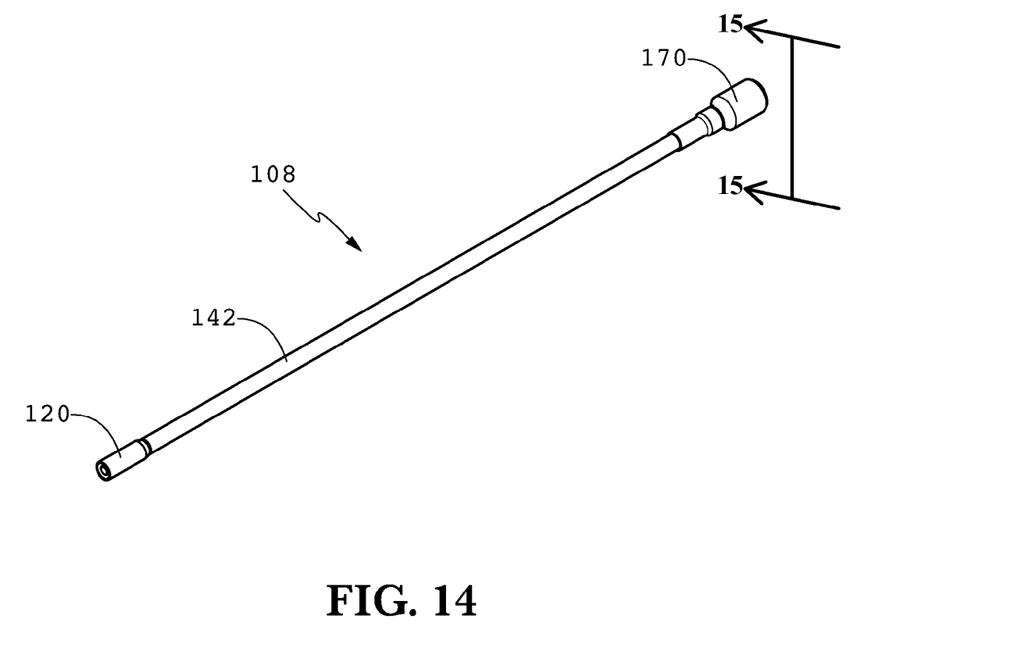
FIG. 14 is a view in perspective illustrating a second embodiment of the present invention.
Figure 15:
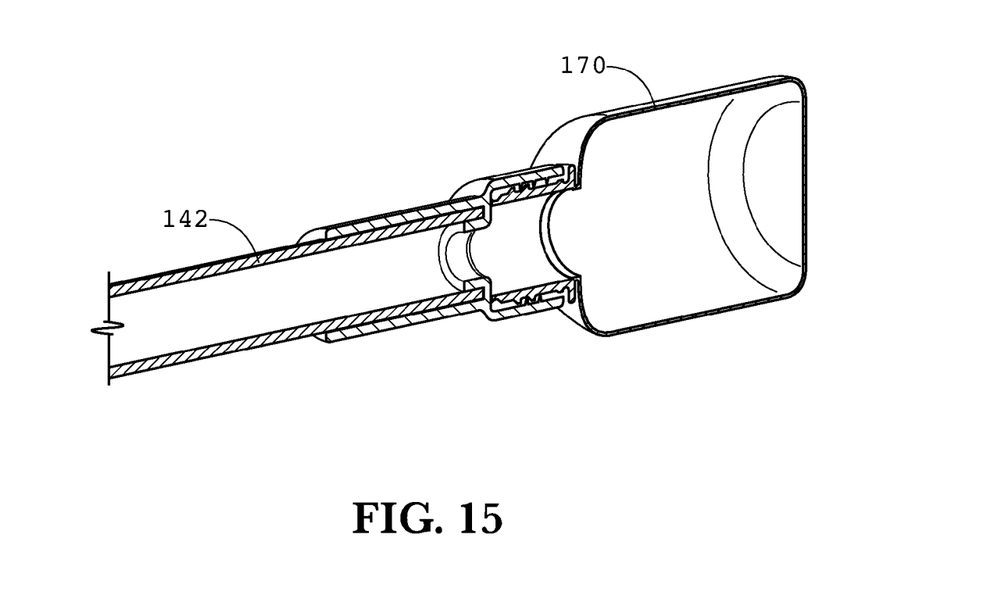
FIG. 15 is a section view in perspective illustrating the embodiment of FIG. 14.

When the user squeezes the trigger 12 fully, the central tube 42 is displaced within the outer tube 20 a distance of approximately 1½ inches. Of course, this distance can be varied to match the corresponding distance the wick 60 is covered by the outer tube 20, which serves as a shroud. The tip of the wick holder 51 is preferably recessed, as shown in FIG. 12, in the outer tube 20 a distance of about 1½ inches, and the wick 60 protrudes from the wick holder 51 about one half inch toward the opening of the outer tube 20. Thus, the tip of the wick 60 is recessed about one inch from the termination of the outer tube 20 so that a pull of the trigger 12 exposes about one-half inch of wick 60 as shown in FIG. 13. When the wick 60 protrudes from the outer tube 20, a gentle, longitudinal application of force to the entire device against a solid object, such as the ground or a hand, compresses the spring 52 and opens the valve mechanism 50. When the valve mechanism 50 is opened, liquid can flow from the passage in the central tube 42 into the wick 60.

Once the device 8 has a wet wick 60, it can be used to apply the liquid, such as herbicide, to a weed or other undesired plant. When a weed is spotted, such as a dandelion plant among grass plants, and the wick 60 is already moist with herbicide as noted above, the tip of the outer tube 20 is directed toward one of the dandelion's leaves and is seated against the chosen leaf. The tip has no herbicide on it and therefore forms a shroud that safely makes contact with desirable leaves it passes. Once the tip of the outer tube 20 is seated firmly against the weed leaf, the trigger 12 is pulled, causing the central tube 42 to be displaced longitudinally relative to the outer tube 20. This displacement forces the wick 60 against a portion of the weed leaf that is positioned radially inside of the outer tube 20, thereby wetting a portion of the weed leaf with the herbicide. After the wick 60 seats against the leaf and the trigger 12 is squeezed further, the valve mechanism 50 on the end of the central tube 42 is thereby opened because the central tube 42 is displaced further toward the weed leaf but the wick 60 and wick holder 51 are not able to move relative to the weed leaf. This further displacement of the central tube 42 relative to the wick holder 51 compresses the spring 52 (as shown in FIGS. 10 and 11) and opens the valve mechanism 50 for as long as the trigger 12 is pulled (preferably less than two seconds, such as one-half second). During this time that herbicide is applied to the leaf by virtue of the saturated wick 60 protruding from the outer tube 20 and contacting the leaf, a small amount of herbicide is also permitted to pass through the aperture 51b to replenish the herbicide taken from the wick 60. The chamber in the central tube 42 through which the liquid flows is sealed to prevent air or liquid from flowing in or out until the valve mechanism 50 is opened. When the valve mechanism 50 opens, the liquid flows out and a similar volume of air flows into the chamber in the central tube to displace the removed liquid.

The process of applying liquid to leaves by squeezing the trigger 12 when the outer tube 20 is seated against the leaf can be repeated as many times as is necessary to apply herbicide to as many plant leaves as is desired. When the liquid is depleted from the container 70 and the central tube 42, the container 70 is unscrewed from the connecting member 40 and discarded, and a full container replaces it. Alternatively, the container 70 can be re-filled and replaced on the central tube 42.

If the device 8 is ready to be stored for an extended period, a cap 100 that is mounted to the handle when not in use can fit over the end of the outer tube 20 when the device 8 is being stored. A cap 71 is similarly placed over the connecting member in place of the container 70 as shown in FIG. 2. Preferably the wick 60 is discarded and the entire device 8 is washed and dried to prevent any chemicals in the device 8 from harming seals or metal components.

Although the preferred embodiment shown above has a mechanism for exposing the wick and valve mechanism for application, a simpler embodiment is also contemplated, as shown in FIGS. 14-17. The device 108 shown in FIG. 14 has a container 170 mounted to a container end of the tube 142. The shroud 120 on an opposite wick end is slidably mounted to the tube 142. The shroud 120 can move longitudinally on the tube 142, but is limited in one longitudinal direction to the extreme shown in FIGS. 14, 16 and 17 and in the opposite longitudinal direction to where the distal tip of the shroud 120 is at the line 180 shown in FIG. 17.

Figure 16:
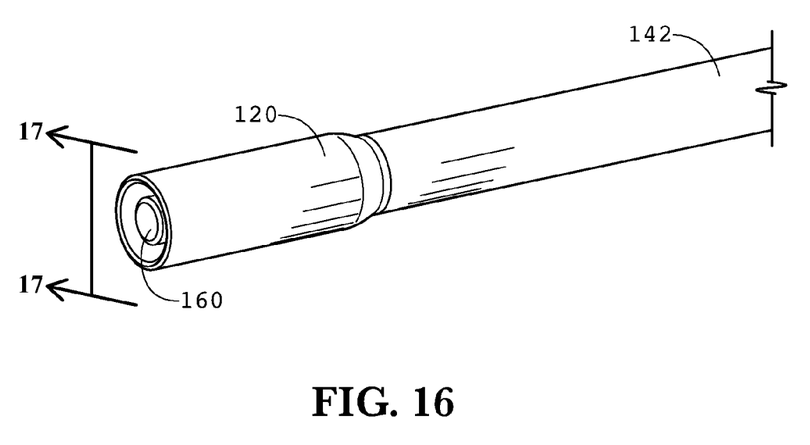
FIG. 16 is a view in perspective illustrating one end of the embodiment of FIG. 14.
Figure 17:
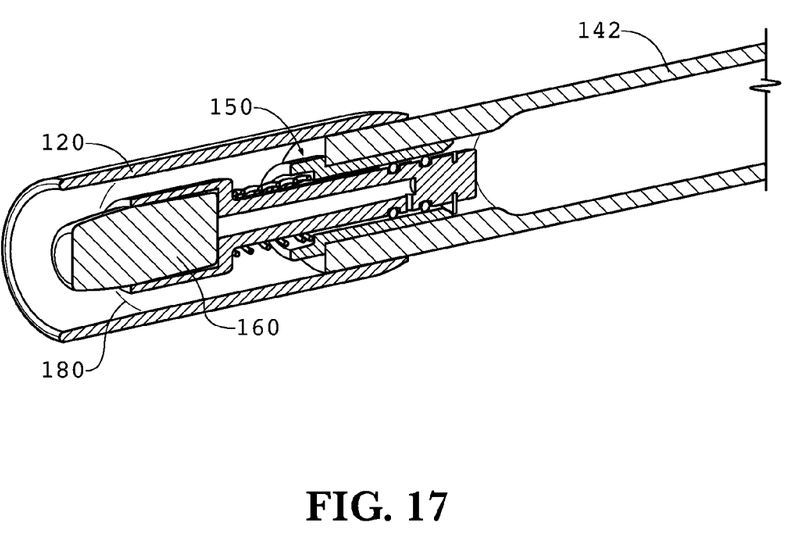
FIG. 17 is a section view in perspective illustrating the end of the embodiment of FIG. 14.

The wick 160 is mounted to a valve mechanism 150 as shown in FIGS. 16 and 17. Liquid in the container 170 flows down into the passage through the tube 142 and to the valve mechanism 150. When the shroud 120 is pulled back from surrounding the wick 160, such as by pushing the tip of the shroud 120 against a surface, such as the Earth, the wick is exposed and can wet a leaf with the liquid in the wick 160. Further pushing compresses, and then opens, the valve mechanism 150 to allow liquid to flow into the wick 160 as with the embodiment of FIGS. 1-13 described above. Indeed, it will become apparent to the person having ordinary skill that the embodiment of FIGS. 14-17 is very similar to the embodiment of FIGS. 1-13, but without the handle mechanism to withdraw the outer tube from around the central tube. Instead, the embodiment of FIGS. 14-17 has replaced the handle mechanism with the shroud 120. The shroud 120 is preferably not spring loaded, but falls to the position shown in FIG. 16 by gravity. Of course, a small spring could be used to force the shroud 120 to a closed position.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for applying a liquid to a substrate, the apparatus comprising:
    (a) an elongated tube having a passage formed therethrough, the tube having first and second opposing tube ends;
    (b) a liquid reservoir formed near the first tube end;
    (c) a valve mechanism at the second tube end and in fluid communication with the passage, the valve mechanism being operable between an open state and a closed state caused by longitudinal compression against the substrate;
    (d) a wick mounted to the valve mechanism, the wick being in fluid communication with the passage when the valve mechanism is in the open state;
    (e) a shroud extending from the second tube end and formed at the end of an outer tube that extends coaxially along the outer surface of the elongated tube, the shroud being movable relative to the wick from a first position in which the wick is substantially surrounded by the shroud to a second position in which the wick is exposed;
    (f) a handle that extends rigidly from the outer tube; and
    (g) a trigger that extends from the handle at one trigger end, pivotably mounts to the handle and drivingly links at an opposite trigger end to the elongated tube, thereby permitting squeezing of the trigger and handle to move the shroud relative to the elongated tube between the first and second positions.

2. A method of applying a liquid to a substrate, the method comprising:
    (a) grasping an elongated tube having a passage formed therethrough near a first end of the tube, the tube having a second, opposing tube end;
    (b) placing the liquid in a reservoir formed near the first tube end;
    (c) disposing a valve mechanism at the second tube end in fluid communication with the passage and mounting a wick to the valve mechanism;
    (d) moving a shroud that extends from the second tube end relative to the wick between a first position in which the wick is substantially surrounded by the shroud to a second position in which the wick is exposed, wherein the shroud is formed at the end of an outer tube that extends coaxially along the outer surface of the elongated tube;
    (e) longitudinally compressing the wick against the substrate to operate the valve mechanism from a closed state to an open state in which the wick is in fluid communication with the passage;
    (f) grasping a handle that extends rigidly from the outer tube; and
    (g) squeezing a trigger that extends pivotably from the handle at one trigger end, thereby driving an opposite trigger end that is linked to the elongated tube to move the outer tube longitudinally relative to the elongated tube.

\* \* \* \* \*